United States Patent Office 3,463,718
Patented Aug. 26, 1969

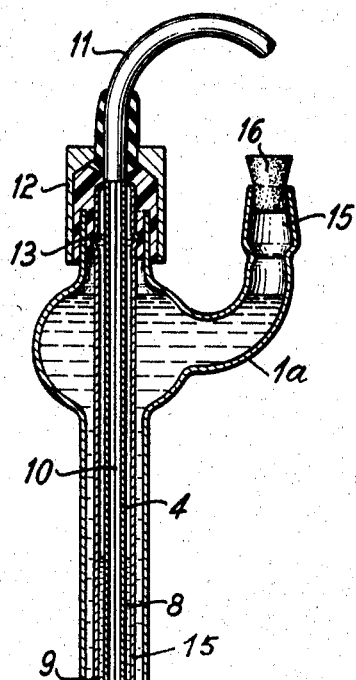
FIG. 1
FIG. 2
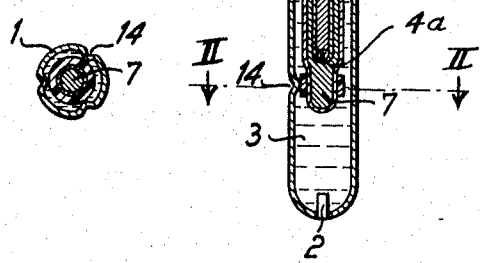

3,463,718
REFERENCE ELECTRODE
Manfred Detemple, Mainz, Germany, assignor to Jenaer Glaswerk Schott & Gen., Mainz, Germany, a corporation of Germany
Filed June 6, 1966, Ser. No. 555,536
Claims priority, application Germany, July 3, 1965, J 28,514
Int. Cl. B01k 3/02
U.S. Cl. 204—195   1 Claim

ABSTRACT OF THE DISCLOSURE

A reference electrode for use in electrochemical potential measurements in which a reference capsule is inserted into a tubular electrode shaft filled with an electrolyte solution, and that a tube is positioned between said reference capsule and said tubular electrode shaft. The tube is closed on all sides and contains in the same manner as the reference capsule in its lower part a mixture of sparingly soluble salt and solid electrolyte of high solubility.

---

The invention relates to a reference electrode, which is always used with electrochemical potential measurements in addition to the indicator electrode and which has the object, independently of the type of the measuring medium and other influences (pressure, temperature) of having as constant as possible an electrode potential.

As a rule, as reference electrodes, are used electrodes of the second kind. In this connection the electrode potential is indicated by the equation:

in which $$E = E_o - \frac{RT}{zF} \ln a_{\text{anion}}$$

E=electrode potential and
$E_o$=standard potential of the electrode of the second kind Since the concentration of the metal salt owing to the solubility product of the salt present as precipitate is constant at a given temperature, the electrode potential is determined by the activity $a$ of the electrolyte.

This electrolyte has also the object of forming at the boundary surfaces of the measuring medium, on or in the diaphragms, as small as possible a boundary surface potential. The latter may to a high degree be dependent on the electrolyte concentration in that it becomes larger with increasing diminution of the concentration.

In practice, the utilization of saturated reference electrodes has become customary, not lastly also due to the fact, that the temperature coefficients of the half-cell potentials with the saturated reference electrode as a rule are smaller than with unsaturated systems.

As saturated reference electrodes are designated such electrodes which at each measuring temperature have an electrolyte as a precipitate.

With the customary reference electrodes for high-temperature measurements it is difficult to insure the saturation in the entire application range. As electrolyte is used mainly potassium chloride which greatly increases its solubility with rising temperature.

Thus the solubility in 100 g. water is at degrees centigrade:

|       | G.   |
|-------|------|
| 0     | 27.6 |
| 20    | 34.0 |
| 50    | 42.6 |
| 100   | 56.7 |

In order not to have to refill the reference electrodes too frequently, they are provided as a rule with a great electrolyte space, which, in order that at high temperature it still is to be saturated with electrolyte, must be filled up to one half of its volume at room temperature with solid salt. This may, however, upon cooling after operating at high temperature, easily lead to a clogging of the diaphragms which always lies at one of the lowest points, owing to the crystallizing out of potassium chloride.

In order to attain a good electrode response of the potential upon a temperature change, it is necessary, that in the actual reference capsule a sufficient amount of solid electrolyte is present. As the reference capsule projects into the shaft of the reference electrode, the capsule lies with its opening at high temperature not in the solid electrolyte, but in the clear solution thereabove. Owing to the heat convection there are produced in the electrolyte solution concentration differences, which when the reference capsule does not extend into the salt, may cause so strong a dissolution of the electrolyte, that the filling of the reference capsule has the effect, owing to a too strong loosening up, of a premature failure of the system.

The object of the invention is to furnish a reference electrode saturated at any temperature, which is simple to produce and to manipulate.

In accordance with the invention, the reference electrode is composed, as the known reference electrodes, of an electrode shaft and a reference capsule or cartridge. In accordance with the invention, the reference capsule is surrounded by a tube projecting into the electrode shaft, and this tube is closed on all sides and is filled with a mixture of solid electrolyte and metal salt, as well as supernatant liquid electrolyte. This tube is in contact with the chamber surrounded by the electrode shaft, exclusively by a diaphragm.

Since owing to the construction according to the invention, there is always sufficient solid electrolyte in excess available, it is always insured that the reference capsule opening is arranged in a saturated electrolyte. The diagram which makes the contact between the tube and the chamber enclosed by the electrode shaft, in accordance with a further object of the invention, is set so high, that it is only in communication with the supernatant liquid phase of the electrolytes. The tubes is closed, so that a refilling of electrolytes is not possible.

The diaphragm has a very small permeability. This does not lead to any disturbances, because at the boundary surface two similar electrolytes with only relatively small differences in concentration are in contact.

Above the electrolyte is disposed an air chamber, which upon increase in temperature above all causes through rising of the vapor pressure the exit of the electrolyte from the reference system. Through addition of means which lower the vapor pressure (for example polyalcohols), this effect is so decreased, that no disturbances can occur.

Losses of electrolyte owing to air expansion are small. Upon cooling off, they are balanced by means of back diffusion from the outer electrolyte chamber. Since the difference in concentration between inner and outer electrolyte chamber is only small and the exchanging quantities of electrolyte are small, there is produced with the large excess of solid electrolytes which is present in the inner electrolyte chamber, a long function or operating period, even with frequently changing temperatures. Tests have shown that the life of such electrodes under changing temperatures, above all under operating conditions in which greater electrolyte exits are necessary on the boundary surface for the measuring medium, is greater than with reference electrodes of the conventional type. The cause for this is the relatively great solubility of the reference-metalylic salts at high temperatures in potassium-chloride solution of high concentration. This holds good above all with reference electrodes with large electrolyte chamber or high consumption of electrolyte, respectively.

In the reference electrode according to the invention, the volume available for the solution of the electrolyte and the sparingly soluble salt is substantially smaller than in usual reference electrodes. If, in addition, excess sparingly soluble salt is added to the excess solid electrolyte of high solubility, no failure of the electrode by too high a consumption of sparingly soluble salt has to be feared.

The reference electrode, in accordance with the invention, is in its outer form and in its manipulation substantially identical with the previously known electrodes. Owing to its construction, the reliability of the constancy of the electrode voltage of the reference element is improved even under extreme conditions. As compared with the known double-electrolyte-electrodes with two refilling openings or in embodiment capable of being built together, the construction of the present invention is simpler and less expensive in production. Errors through utilization of electrolyte solutions with changing concentrations are not possible.

The drawing illustrates by way of example diagrammatically a reference electrode constructed in accordance with the invention.

FIG. 1 is a longitudinal section of such a reference electrode, and

FIG. 2 is a cross-sectional view along the line II—II of FIG. 1.

Referring to the drawing, the tubular shaft 1 of the reference electrode is provided at its upper end with the customary refill extension 1a having an aperture 15 closed by a plug 16 while in the lower part of the shaft 1 is arranged the outer diaphragm 2. The shaft 1 is filled with electrolyte solution 3. In the shaft 1 is inserted the usual reference capsule or cartridge 4 which contains the electrode metal 5, and a mixture of the sparingly soluble salt with an electrolyte 6. At its lower end the reference capsule or cartridge is provided with an aperture which is closed by a plug 4a, for example made of cotton.

For the discharge of the potential is used a metal wire 10 and the connecting cable 11, which extends through a closing cap 12.

In accordance with the invention, the reference capsule or cartridge 4 is not inserted directly into the electrode shaft, but is surrounded by a tube 15 which is closed on all sides and contains in its lower part a mixture 7 of said sparingly soluble salt and solid electrolyte of high solubility mentioned above, both being in contact with saturated solution 8, which covers the two solid phases up to a level above the inner diaphragm 9. This diaphragm 9 allows the two liquid phases 3 and 8 to form a liquid junction and it is never in direct contact with the solid phases being in the lower part of tube 4. Otherwise, as already stated, the tube 15 is completely closed. Mechanical stability of the inner tube 15 is provided by bulge 13 in the upper part and support 14 in the lower part of the tubular shaft 1.

What I claim is:

1. A reference electrode comprising a tubular electrode shaft and a reference capsule having a liquid junction, said reference capsule being surrounded by a tube positioned between said reference capsule and said electrode shaft, said tube containing a mixture of a solid and highly soluble electrolyte and a sparingly soluble salt the cation of which corresponds to the metal of the electrode in direct contact with said liquid junction of said reference capsule, as well as a supernatant electrolyte solution in contact with said mixture, said tube being further closed on all sides except for a diaphragm providing a liquid junction between said electrolyte solution in said tube and the solution in said electrode shaft, said diaphragm being disposed at such a high level so as to be located solely in the liquid phase of the electrolyte.

References Cited

UNITED STATES PATENTS

| 2,977,293 | 3/1961  | Ingold          | 204—195 |
| 3,065,151 | 11/1962 | Schaschl et al. | 204—195 |
| 3,077,446 | 2/1963  | Van den Berg    | 204—195 |
| 3,103,480 | 9/1963  | Watanabe et al. | 204—195 |
| 3,281,348 | 10/1966 | Schumacher et al. | 204—195 |

FOREIGN PATENTS

| 678,648 | 9/1952 | Great Britain. |

OTHER REFERENCES

Germany, application S.N. F 9115, printed Sept. 15, 1955.

JOHN H. MACK, Primary Examiner

T. TUNG, Assistant Examiner